(12) United States Patent
Cetintas et al.

(10) Patent No.: US 12,223,399 B2
(45) Date of Patent: Feb. 11, 2025

(54) SYSTEM AND METHOD FOR DEEP ENRICHED NEURAL NETWORKS FOR TIME SERIES FORECASTING

(71) Applicant: YAHOO ASSETS LLC, Dulles, VA (US)

(72) Inventors: Suleyman Cetintas, Cupertino, CA (US); Xian Wu, Notre Dame, IN (US)

(73) Assignee: YAHOO ASSETS LLC, Dulles, VA (US)

( * ) Notice: Subject to any disclaimer, the term of this patent is extended or adjusted under 35 U.S.C. 154(b) by 1142 days.

(21) Appl. No.: 17/083,020

(22) Filed: Oct. 28, 2020

(65) Prior Publication Data

US 2022/0129790 A1    Apr. 28, 2022

(51) Int. Cl.
*G06N 20/00*    (2019.01)
*G06F 16/903*    (2019.01)

(52) U.S. Cl.
CPC .......... *G06N 20/00* (2019.01); *G06F 16/903* (2019.01)

(58) Field of Classification Search
CPC .... G06N 20/00; G06F 16/903; G06F 16/9024
USPC ........................................................ 706/12
See application file for complete search history.

(56) References Cited

U.S. PATENT DOCUMENTS 10,339,235 B1    7/2019  Ciarlini et al.
10,936,947 B1 *  3/2021  Flunkert ................ G06N 3/044
11,126,660 B1 *  9/2021  Sen ........................ G06N 3/044

2015/0142513 A1 *  5/2015  Shnayder ........... G06Q 30/0272
                                                        705/7.31
2018/0060732 A1    3/2018  Yuan et al.
2018/0211164 A1    7/2018  Bazrafkan et al.
2020/0104706 A1    4/2020  Sandler et al.

FOREIGN PATENT DOCUMENTS

CN        111079931 A  *  4/2020

OTHER PUBLICATIONS

Miller, Alexander, et al. "Key-value memory networks for directly reading documents." arXiv preprint arXiv:1606.03126 (2016). (Year: 2016).*
Chung J., et al., Empirical evaluation of gated recurrent neural networks on sequence modeling, NIPS 2014 Workshop on Deep Learning, Dec. 2014, arXiv:1412.3555, v1 (9 pgs.).
Finn, P., et al., Model-agnostic meta-learning for fast adaptation of deep networks, Proceedings of the 34th International Conference on Machine Learning in PMLR, 2017, pp. 1126-1135, v70 (10 pgs.).

(Continued)

*Primary Examiner* — Kieu D Vu
*Assistant Examiner* — Broderick C Anderson
(74) *Attorney, Agent, or Firm* — Venable LLP

(57) ABSTRACT

The present teaching relates to method, system, medium, and implementations for machine learning. Upon receiving input data associated with a time series, hidden representations associated with the time series in a feature space are obtained and used to generate a query vector in a query space. Such generated query vector is then used to query relevant historic information related to the time series. The query vector and the relevant historic information are aggregated to generate at least one queried vector, which is aggregated with the hidden representations to generate enriched hidden representations that enhance the expressiveness of the hidden representations.

17 Claims, 15 Drawing Sheets

(56) References Cited

OTHER PUBLICATIONS

Miller, A., et al., Key-Value Memory Networks for Directly Reading Documents, Proceedings of the 2016 Conference on Empirical Methods in Natural Language Processing, Oct.-Nov. 2016, pp. 1400-1409, arXiv:1606.03126, v2 (10 pgs.).

Non-Final Office Action mailed Nov. 21, 2023 in U.S. Appl. No. 17/083,093.

Deshpande et al., "Streaming Adaptation of Deep Forecasting Models using Adaptive Recurrent Units", The 25th ACM SIGKDD Conference on Knowledge Discovery and Data Mining (KDD '19), Aug. 4-8, 2019, pp. 1-10, Anchorage, AK, USA. ACM, New York, NY, USA.

Huang et al., "Adaptive Sampling Towards Fast Graph Representation Learning", 32nd Conference on Neural Information Processing Systems (NIPS 2018), pp. 1-12, Montreal, Canada.

\* cited by examiner

SYSTEM AND METHOD FOR DEEP ENRICHED NEURAL NETWORKS FOR TIME SERIES FORECASTING

CROSS-REFERENCE TO RELATED APPLICATIONS

The present application is related to U.S. patent application Ser. No. 17/083,093, filed Oct. 28, 2020, which is incorporated herein by reference in its entirety.

BACKGROUND

1. Technical Field

The present teaching generally relates to a computer, and, more specifically, relates to machine learning.

2. Technical Background

In recent decades, the ubiquitous presence of the Internet and data access in electronic forms have facilitated advancement of various technologies, including big data analytics and machine learning. Artificial intelligence (AI) technologies and applications thereof usually rely on machine learning based on big data. For example, machine learning techniques have been used for learning preferences of users via contents consumed and forecasting specific behavior based on historic time series data. In recent years, time series forecasting has drawn substantial attention with a wide range of applications, such as forecasting sales volume and click traffic. The goal of time series forecasting includes to predict future measurements of a target time series by leveraging temporal patterns identified from historical observations.

With the proliferation and success of artificial neural networks, recurrent neural networks (RNNs) are widely adopted for capturing complex non-linear temporal dependencies. To further enhance the relation extraction and representation, some research works focus on integrating more appropriate modules or features, such as attention mechanisms and multiple resolutions aggregation. Existing state-of-the-arts works aim at improving what can be achieved using basic RNN-based methods by sharing temporal patterns globally across different time series. This is illustrated in FIG. 1 (PRIOR ART), which depicts a typical framework 100 of traditional approach to forecasting temporal pattern via machine learning. As seen, training data archive 110 includes training data of multiple time series $X_1$, $X_2$, . . . , $X_m$, which are used by a deep learning mechanism 120 as training data to learn model parameters 130. Such learned model parameters 130 are then used by a time series forecaster 140 so that whenever it receives a time series from time 1-t, say $X_1^{1-t}$, it can predict or forecast the time series measurement at time t+1 or $\hat{X}_1^t$ based on the model parameters 130.

In this framework, training data from different time series may be used to train the model parameters, attempting to capture the characteristics of all of these time series. However, different time series, especially those collected from different data sources, likely exhibit very different temporal patterns. For example, daily sales for a store located in the downtown may follow a very different pattern than that of a store located in suburbs. Thus, purely relying on pattern generalization across different time series and encoding their characteristics via global modeling does not work well.

In some applications, the desire is towards embracing pattern specialization, which trains specialized model parameters using training data of that special type of time series. This mode of operation also presents data deficiency problems. To achieve such customized treatments, a straightforward solution is to train a forecasting model for each target time series. However, a well-trained model, especially a model based on neural networks, tends to significantly rely on massive training data, which may not be available or accessible in real-world scenarios. Another issue has to do with long-range temporal patterns. A time series may start at any time and span across variable time periods. Temporal patterns between existing observations and the ones in predictions may not be well-captured by the learned model if such patterns are not observed in the target time series. For instance, the forecasting for stores with one year data is expected to be easier than the ones with less data, such as only a couple of months, as the more data we have, the more underlying temporal patterns could be identified. However, how to capture long-range historical temporal patterns remains a daunting task.

Thus, there is a need for methods and systems that address the deficiency of existing approaches.

SUMMARY

The teachings disclosed herein relate to methods, systems, and programming for advertising. More particularly, the present teaching relates to methods, systems, and programming related to exploring sources of advertisement and utilization thereof.

In one example, a method, implemented on a machine having at least one processor, storage, and a communication platform capable of connecting to a network for machine learning is provided. Upon receiving input data associated with a time series, hidden representations associated with the time series in a feature space are obtained and used to generate a query vector in a query space. Such generated query vector is then used to query relevant historic information related to the time series. The query vector and the relevant historic information are aggregated to generate at least one queried vector, which is aggregated with the hidden representations to generate enriched hidden representations that enhance the expressiveness of the hidden representations.

In a different example, a system is disclosed for machine learning comprises a relevant historic information query engine, a graph based historic information aggregator, and a feature aggregator. The relevant historic information query engine configured for receiving input data associated with a time series, obtaining hidden representations associated with the time series in a feature space, generating a query vector based on the hidden representations in a query space, and querying, based on the query vector, relevant historic information related to the time series. The graph based historic information aggregator is configured for aggregating the relevant historic information with the query vector to generate at least one queried pattern vector. The feature aggregator is configured for enriching the hidden representations by aggregating therewith the at least one queries pattern vector to generate enriched hidden representations, wherein the enriched hidden representations enhance expressiveness of the hidden representations.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for machine learning. Data recorded on the medium, once read by a machine, causes the machine to perform the following steps. machine learning. Upon receiving input data associated with a time series, hidden representations associated with the time series in a feature space are obtained and used to generate a query vector in a query space. Such generated query vector is then used to query relevant historic information related to the time series. The query vector and the relevant historic information are aggregated to generate at least one queried vector, which is aggregated with the hidden representations to generate enriched hidden representations that enhance the expressiveness of the hidden representations.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional approaches in learning time series forecasting. The present teaching discloses a solution that overcomes the challenge and deficiency of the traditional solutions via a framework that is able to enrich the training data by enhancing the expressiveness of encoded temporal patterns via historic patterns. In addition, model parameters learned from general time series data can be customized efficiently in the CTSF framework to remedy the problems associated with data deficiency and long-range pattern modeling. For enrichment of training data, historical patterns may be queried to enrich the pattern information and broaden time span of the input sequence. With respect to customization, the CTSF framework enables explicit combination of generalization among time series and specialization of target time series forecasting. The CTSF framework as disclosed herein is configured with a bidirectional recurrent neural network (RNN) (such as a gated recurrent unit neural network or GRU) to encode target time series.

Figure 1:
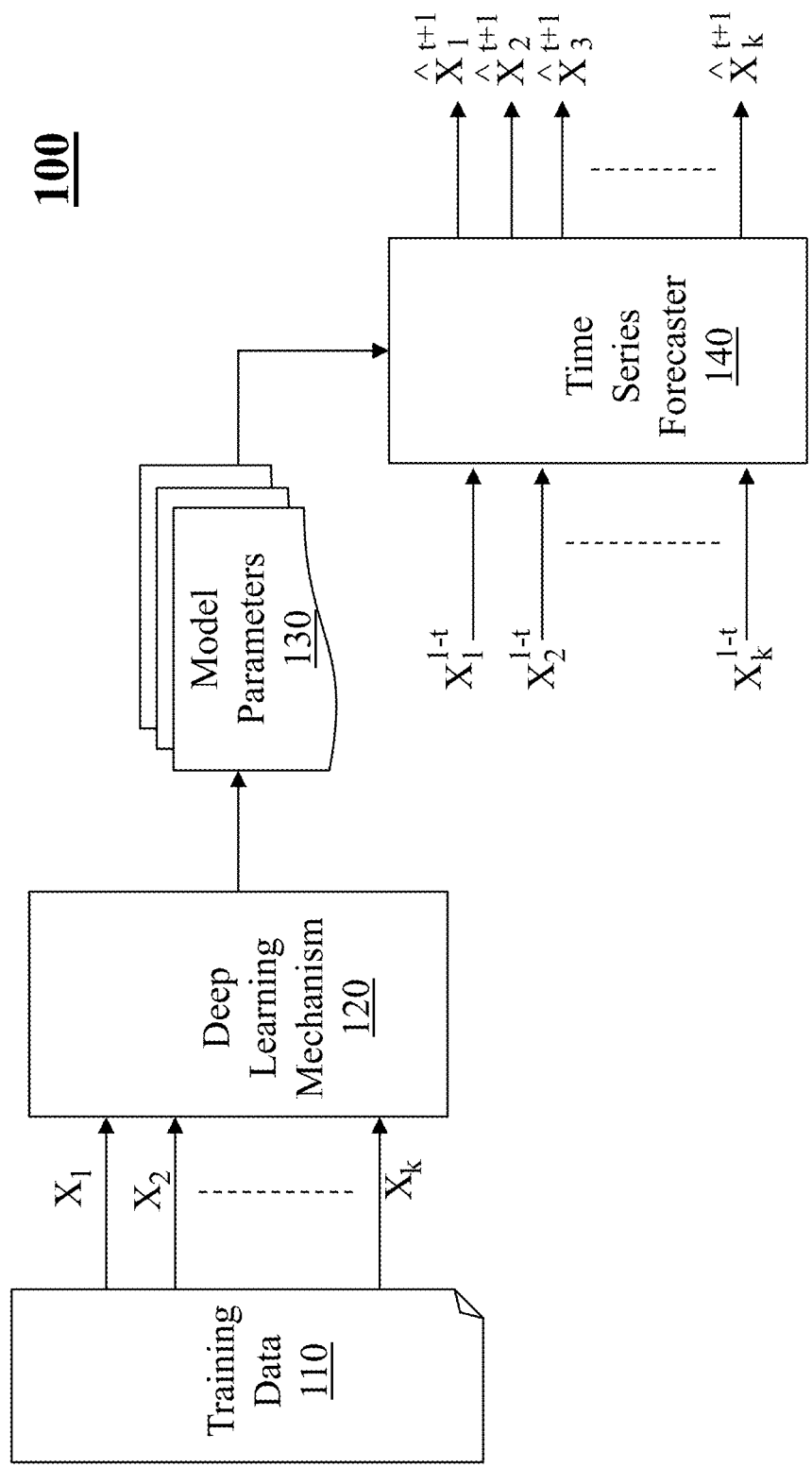
FIG. 1 (PRIOR ART) depicts a traditional framework for learning time series forecasting.
Figure 2A:
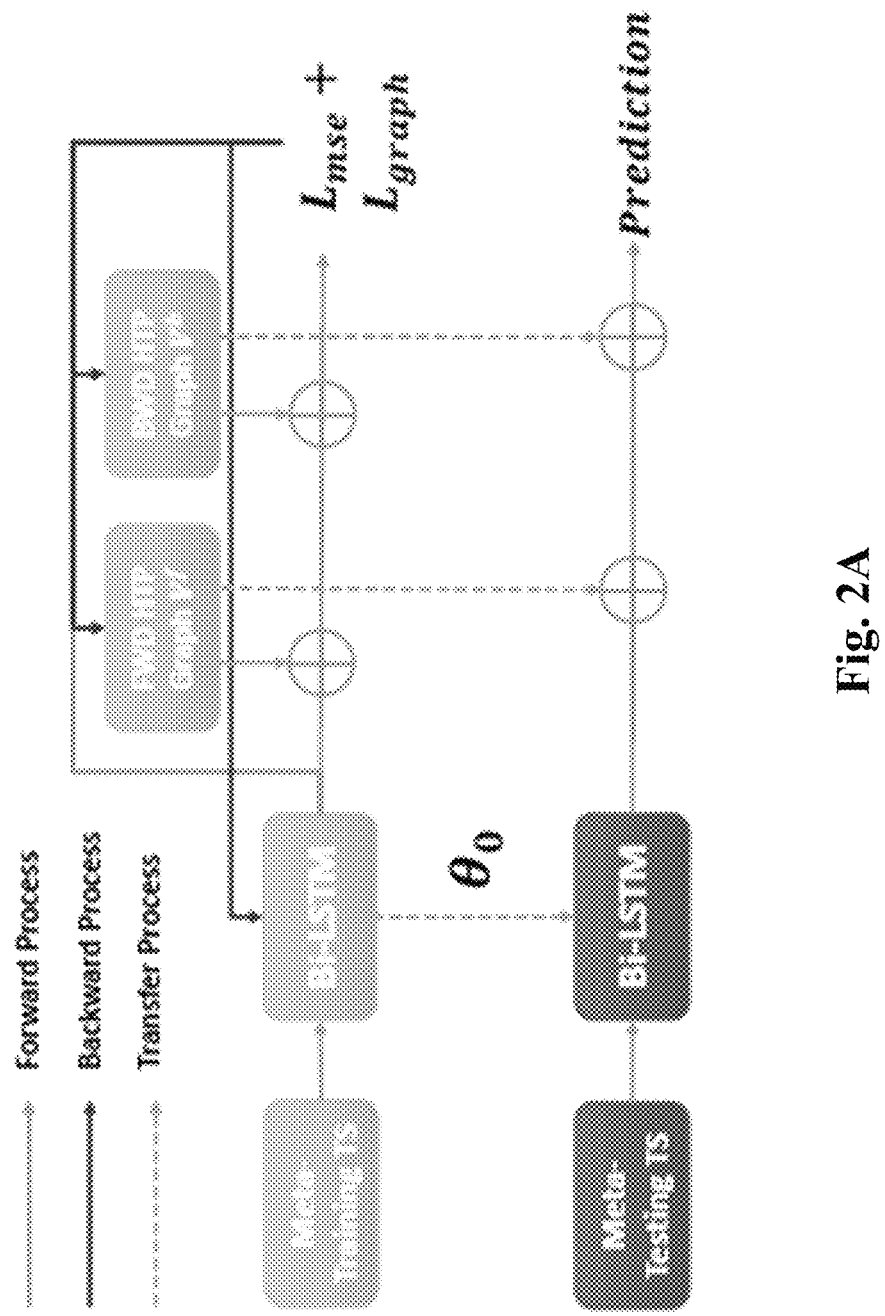
FIG. 2A shows a conceptual exemplary schematic for enriched time series forecasting learning with customization, in accordance with an exemplary embodiment of the preset teaching.

The framework includes three components: a bi-GRU base model, a historical temporal pattern (HTP) graph, and a customized forecasting module. The base model is used to encode a time series. The HTP graph is used in enriching the representation of a time series based on historical time series. The customized forecasting module is configured to initially learn optimal globally-shared model parameters and then adjust such learned global model parameters to derive customized model parameters for each time series. First, the based model maps an observation sequence into an embedding vector, which expresses the underlying patterns and then outputs predicted values based on the learned embedding. This is shown in FIG. 2A below. Second, the HTP graphs is provided to enhance the forecasting capability. This is achieved by extracting relevant temporal pattern across time series and interacting learned embedding vector with a memory network, which organizes the pattern information through clustering historical temporal patterns of all series during a training process. This is shown in FIG. 2A as forward and backward HTP Graph. Third, the model customization module optimizes the globally-shared parameters of the base model and adjust them to derive adaptive model parameters for each individual time series. This is shown in FIG. 2B.

Figure 2B:
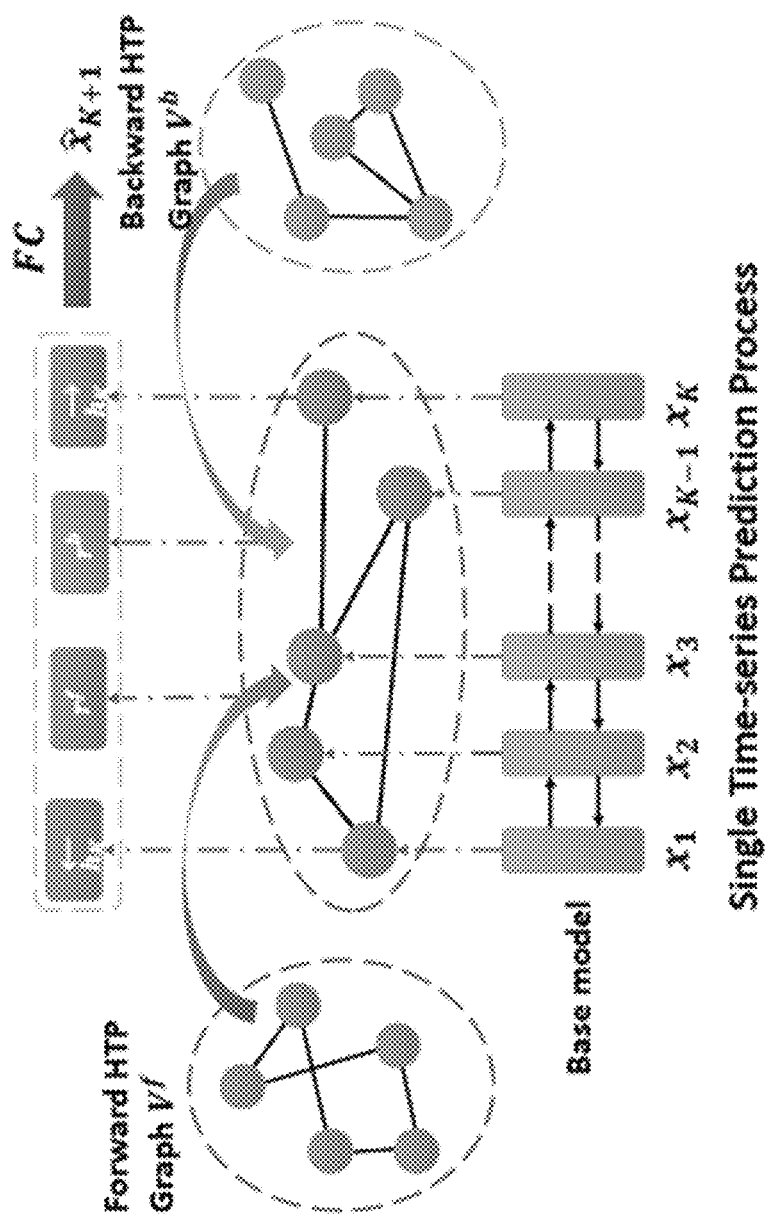
FIG. 2B shows a conceptual exemplary schematic for a single time-series prediction process of an enriched customized deep learning mechanism, in accordance with an exemplary embodiment of the preset teaching.

These concepts associated with the CTSF framework are illustrated schematically in FIGS. 2A-2B. FIG. 2A shows an exemplary conceptual schematic for enriched time series forecasting learning with customization, in accordance with an exemplary embodiment of the preset teaching. This schematic shows the pipeline of CTSF, which includes two tracks. One track on the top is for training phase and one on the bottom is for testing phase. The Bi-LSTM represents a bidirectional long and short-term memory. Model parameters $\theta_0$ represent the model parameters of the base model learned during the training track, which are used by the Bi-LSTM during testing to generate predictions of time series measurements given testing data. During the training phase, the training time series data are enriched via forward HTP and backward HTP graphs, as shown. The base model parameters are updated during training by minimizing two types of errors, $L_{mse}$ and $L_{graph}$. Details of enrichment via HTP graphs will be provided below.

FIG. 2B shows an exemplary conceptual schematic for customized deep learning mechanism, in accordance with an exemplary embodiment of the preset teaching. In this schematic, hidden representations learned in training based on time series data from multiple sources represent the base model, which is to be customized based on specific time series training data. The learned based model parameters are used to query forward and backward HTP Graph to further enhance the representation. All information is then aggregated to make a prediction. Below, more details on enrichment of training data and mode customization are provided.

Before the detailed discussion, some definitions are provided first. Time series information from a source is defined as one time series, which is composed of a set of chronologically ordered observations that are collected at equal-space time intervals. Suppose there are m time series data sources, $X=(X_1, \ldots, X_i, \ldots, X_m)$ denotes the corresponding m time series and $X_i=(x_i^1, \ldots, x_i^t, \ldots x_i^{|\mathcal{T}_i|})$ ($\mathcal{X}_i \in \mathbb{R}^{|\mathcal{T}_i|}$) denotes the ith time series, where $|\mathcal{T}_i|$ represents the number of measurements in the ith time series. Each measurement $x_i^t$ is also associated with a timestamp t. In general, different time series may vary in number of involved measurements. The concept of time series forecasting is to infer or predict a future measurement based on or by leveraging temporal patterns from historical (previously occurred) observations. That is, given K previous observations ($x_i^{t-K}, \ldots, x_i^{t-1}$) in the ith time series, the objective of forecasting is to predict, e.g., the next measurement $x_i^t$ of the time series at time t.

Based on such definitions and notations, the problem of customized time series forecasting via knowledge transfer can be defined as follows. Given time series data X, the objective is to provide a customized time series forecasting model, which is formulated as:

$$\min \sum_{i=1}^{\mathcal{J}} \sum_{j=1}^{\mathcal{T}_i} \|x_i^r - \tilde{x}_i^r\|_2^2 = \min \sum_{i=1}^{\mathcal{J}} \sum_{j=1}^{\mathcal{T}_i} \|x_i^r - f_i([x_i^{t-k}, \ldots, x_i^{t-1}])\|_2^2, \quad (1)$$

where $f_i$ represents the learned time series forecasting model for time series $\mathcal{X}_i$.

To derive customized model parameters for forecasting with respect to time series from a specific source in the framework of CTSF, a base model may first be established using training time series data from multiple sources. The base model aims to forecast future observations by understanding the time-ordered pattern of input sequence. It may be constructed using neural networks, e.g., a bi-directional GRU (bi-GRU) followed by several fully connected layers.

For each time series i, the output representation of bi-GRU may be represented as $h_i^k=[\vec{h}_i^k \vec{h}_i^k]=[\text{GRU}(\vec{h}_i^{k-1}, x_i^k), \text{GRU}(\vec{h}_i^{k+1}, x_i^k)]$, where $h^k$ is the hidden representation of bi-GRU at time stamp k. For each time stamp k, $h_i^k$ is fed into several fully connected layers, which generates a predicted value $\hat{x}_i^{k+1}$, which is defined as $\hat{x}_i^{k+1}=\text{FC}(h_i^k)$. The parameters of the base model f is optimized by minimizing some type of error, e.g., the mean-squared-error (MSE) loss as:

$$L_{mse} = \frac{1}{2\sum_{i=1}^{\mathcal{J}} \mathcal{T}_i} \sum_{i=1}^{\mathcal{J}} \sum_{t=1}^{\mathcal{T}_i} \|\hat{x}_i^t - x_i^t\|_2^2, \quad (2)$$

where $x_i^t$ is the real observation at t-th time of time series $\mathcal{X}_i$.

Next, the enrichment via HTP graph is disclosed. Based on the above definitions of the base model, the extracted hidden representations are encoded based on the fixed-length input. Because information contained in a fixed length input may be limited (in some situations may be severely limited), this configuration likely may not capture long-term temporal patterns in some situations. For example, in some situations, the observation time series used for prediction may be truncated to the latest K observations (input time steps K). In some situations, the target time series (e.g., a newly emerged time series) may span over only a very short time frame. Such issues leads to failure of capturing long-term temporal patterns and degrades the predicted accuracy within a limited time scope. The hidden representation may be enriched by incorporating relevant historical information to address such issues. The purpose is to broaden the time scope of input sequence by dynamically querying relevant historical information across all time series archived.

In querying/retrieving the relevant patterns, the goal is to enhance the expressiveness of $h_i^k$ by using the hidden representations $\{h_i^1, \ldots, h_i^K\}$ to query the HTP Graph. This involves three steps. The first step is to query space projection. The second step is to aggregate relevant historical information. The third step is to aggregate features. The first step is for query space projection, the hidden representation H is projected into the query space, which is denoted as:

$$\vec{q}_{\mathcal{K}} = W_q^f \vec{h}_{\mathcal{K}} + b_q^f \quad (3)$$

where $W_q^f \in \mathbb{R}^{d_q \times d_h}$ and $b_q^f \in \mathbb{R}^{d_q}$ are learnable parameters. For illustration purposes, the query process described herein is in the forward direction. The backward query process is similar but using a separate set of trainable parameters.

After the relevant information query, the next step is to aggregate the queried historical patterns by replacing relevant scores. If the representation of a vertex set in the HTP graph, e.g., a forward graph, is $V^f = \{v_1^f, \ldots, v_C^f\}$, to get the relevant information from the HTP graph, the most intuitive is to aggregate $\vec{Q}=\{\vec{q}^1, \ldots \vec{q}^k\}$ into $\vec{q}$ (e.g., using mean pooling) and then query the HTP graph. C is the total number of vertices in the vertex set in the HTP graph. Both c and c' refers to a specific vertex in this set such as $V^f=(v_1^f, \ldots, v_c^f, \ldots, v_{c'}^f, \ldots, v_C^f)$, where $v_c^f$ is the $c^{th}$ vertex among a set of C vertices in total, and similarly $v_{c'}^f$ refers to the $c'^{th}$ vertex. Pooling as discussed herein corresponds to an aggregation operator in neural networks, which may be pooling using some exemplary potential functions such as min, max, sum, average/mean, etc. For example, by "mean pooling", it may be that $\{\overline{q^1}, \ldots, \overline{q^k}, \ldots, \overline{q^{k'}}, \ldots, \overline{q^K}\}$ are aggregated into $\overline{q}$ by taking the mean of their values. Since $\overline{q^k}$ is a projected version of $h^k$ at timestamp/step k (for a particular time series), this aggregation would get a single embedding representation $\overline{q}$ for the whole time series (from timestamps 1 to K).

The queried information may be aggregated by attention mechanism as follows:

$$r^f = \sum_c \frac{\exp(\langle \vec{q}, v_c^f \rangle)}{\sum_{c'} \exp(\langle \vec{q}, v_{c'}^f \rangle)} v_c^f \quad (4)$$

where $\langle . , . \rangle$ represents an inner product. Equation (4) defines the forward (hence the f) historical pattern vector $r^f$ as a weighted summation of all $v_c^f$ (hence the summation with c). The weight of the $c^{th}$ forward pattern graph vertex $v_c^f$ is defined by its similarity to $\vec{q}$, e.g., via the inner product in the numerator, that is normalized by the denominator (c' loop) to make the sum of weights 1.

$\vec{q}$ in equation (4) is the aggregation of $\{\overrightarrow{q^1}, \ldots, qk, \ldots, \overrightarrow{q^{k'}}, \ldots, \overrightarrow{q^K}\}$ via "mean pooling" and is used to query the historical pattern graph $V^f = \{v_1^f, \ldots, v_c^f, \ldots, v_{c'}^f, \ldots, v_C^f\}$, that includes the hidden representations of other time series in the dataset. $\overline{q^k}$ and $\overline{q^{k'}}$ represent query space projections of $h^k$ and $h^{k'}$ (as shown in Equation (3)), that are embeddings/hidden representations of a particular time series (that need to be enriched and do forecasts for later) at different timestamps/steps k and k'. As simple mean pooling aggregation is averaging the information across all timestamps within a time series, it may lead to loss of temporal information within this particular time series.

Representation aggregation before information query may fail to distill effective information without exploring the relevance between different time step representations and HTP graph. To reduce information loss, a graph query method is adopted to simultaneously consider interactions of $\vec{q}_p^k - \vec{q}_p^{k'}$, and $v_c - v_{c'}$, and $\vec{q}_p^k - v_c$, leading to three types of edge weights. The first edge weight corresponds to $\vec{q}_p^k - \vec{q}_p^{k'}$ which represents the interaction of different timestamps/steps within a time series to use its own past to enrich its recent past representations and vice versa to capture seasonality. Therefore, $\vec{q}_p^k$ and $\vec{q}_p^{k'}$ are added into the HTP graph as:

$$\varepsilon(\vec{q}_p^K, \vec{q}_p^{K'}) = \sigma(W_{eq}^f |\vec{q}_p^k - \vec{q}_p^{k'}| + b_{eq}^f) \text{ where } \sigma(x) = \frac{1}{1+e^{-x}}.$$

The edge weight is higher/stronger if $\overline{q^k}$ and $\overline{q^{k'}}$ are very similar to each other and lower/weaker if they are not. $W_{eq}^f$ is a simple learnable parameter vector, and $b_{eq}^f$ is a learnable scalar (intercept).

The second edge weight is directed to interaction between vertices $v_c^f$ and $v_{c'}^f$ in the historical pattern graph and is related to the hidden representations of other time series in the dataset to enrich each other. This type of edge weight is defined in a similar manner.

$$\varepsilon(v_c^f, v_{c'}^f) = \sigma(W_{ev}^f |v_c^f - v_{c'}^f| + b_{ev}^f) \text{ where } \sigma(x) = \frac{1}{1+e^{-x}}.$$

Note that the weight of the edge will be higher/stronger if hidden representations of two different time series in the database are similar to f each other, lower/weaker if they are not. $W_{ev}^f$ is a simple learnable f parameter vector, and $b_{ev}^f$ is a learnable scalar (intercept).

The third edge weight is directed to interaction between $\overline{q^k}$ and $\vec{v_c^f}$, aiming to characterize the interaction of the query-space representation $\overline{q^k}$ of a particular time series at the $k^{th}$ timestamp vs. any hidden representations $V_c^f$ of other time series in the historic dataset. This way, $\overline{q^k}$ can be enriched if it is similar to some other time series in the historic dataset. This edge weight is defined as:

$$\varepsilon(\overline{q^k}, v_c^f) = \exp(-\|\overline{q^k} - v_c^f\|_2^2)$$

It may also be defined the same way as the first and the second edge weight functions above as:

$$\varepsilon(\overline{q^k}, v_c^f) = \sigma(W_{eqv}^f |\overline{q^k} - v_c^f| + b_{eqv}^f) \text{ where } \sigma(x) = \frac{1}{1+e^{-x}}.$$

The choice of an edge weight function may differ, which may not matter that much so long as it makes the edge weight higher when $\overline{q^k}$ and $v_c^f$ are similar to each other, and lower when they are not. $W_{eq}^f, W_{ev}^f \in \mathbb{R}^{1 \times d_q}$ and $b_{eq}^f$, $b_{ev}^f \in \mathbb{R}^1$ are learnable parameters.

Based on the above defined edge weights, a new graph may be constructed with the vertex set with the following vertices (projected hidden representations of a particular time series as well as all other time series) $V_0^f = \{\overline{q^1}, \ldots, qk, \ldots, \overline{q^k}, \ldots, \overline{q^K}, v_1^f, \ldots, v_c^f, \ldots, v_{c'}^f, \ldots, v_C^f\}$ and edge weights $\varepsilon_0^f$. Each of the vertices in $V_0^f$ includes vector representations (embeddings) and the edge weights $\varepsilon_0^f$, calculated using the edge weight formulas as discussed above. Then, a Graph Neural Network (GNN) may be leveraged with ReLU activation to aggregate the most relevant historical information. That is, over the constructed pattern graph, a Graph Neural Network (GNN) with ReLU activation that has $n_L$ layers is utilized to enrich the information in each vertex (vector) by aggregating the information in its neighboring/connected vertices via the weighted edges that connect them in the graph. In some embodiments, the aggregation may use three types of links at the same time. That is, $$\mathcal{V}_{\ell+1}^f = \text{ReLU}(\text{GNN}(\mathcal{E}_0^f, v_\ell^f; \mathcal{W}'_\ell)), \quad (5)$$

where $\ell$ is the layer index, $\mathcal{W}'_\ell$ are trainable parameters on $\ell$-th layer. After $n_L$ stacked GNN layer, we get the relevant historical patterns $r^f$ from the K-th row of $\mathcal{V}_{n_L}$.

The third step is on feature aggregation, during which the queried forward pattern vector $r^f$ and backward pattern vector $r^b$ are projected to the same feature space and concatenated with $\tilde{h}^K$ as:

$$h^{k'} = (\mathcal{W}_f^f, r^f + b_f^f) \oplus (\mathcal{W}_f^b, r^b + b_f^b) \oplus \vec{h}_K \oplus \tilde{h}_K \quad (6)$$

where $\mathcal{W}_f^f, \mathcal{W}_f^b$ are learnable parameters and $\oplus$ is a concatenation operation. In this operation, $h^k$ is replaced with $h^{k'}$ which is ultimately fed into fully connected layers of the base model for predictions.

Figure 2C:
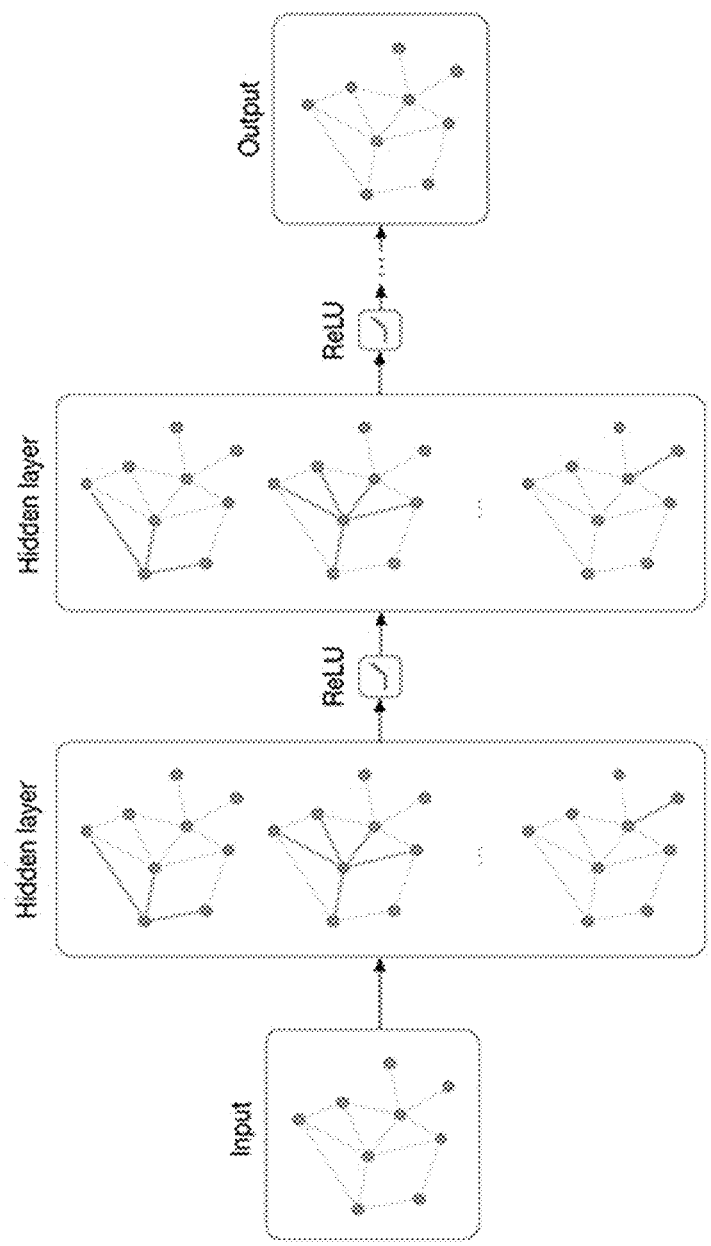
FIG. 2C shows a conceptual exemplary schematic for an aggregation operation through which the time series forecasting is based on both the input sequence and relevant historical patterns to broaden the time scope.

Through such aggregation operation, the time series forecasting is based on both the input sequence and relevant historical patterns to broaden the time scope. With this aggregation, as any vertex that has higher weighted edges with other vertices that are more similar with it, this propagation scheme enables to aggregate the most relevant historical information in the pattern graph utilizing these three types of edge definitions. Thus, each vertex vector in the initial graph's vertex set $V_0^f$ is utilized by the $1^{st}$ hidden layer of the GNN to construct the new/enriched vertex vector representations of the next hidden graph layer—and the set of all vertex vectors after the $1^{st}$ layer is $V_1^f$. Similarly, vertex vectors of $V_{l+1}^f$ are constructed as an aggregation over the vertex vectors of $V_l^f$, using the edge weights $\varepsilon_0^f$ and the corresponding GNN parameters of the $l^{th}$ layer $W_l'$. Ultimately, after the last GNN layer $n_L$, each vertex vector derives its final enriched representations using all three types of edge definitions. And $\overline{q^k}$ vs $\overline{q^{k'}}$ that represent query space projections of $h^k$ and $h^{k'}$ (which are embeddings/hidden representations of a particular time series at different timestamps/steps k and k', i.e., $x^k$ and $x^{k+1}$) will be more and more enriched through each layer of the GNN, and finally become $r^f_k$ and $r^b_{k'}$ after the last layer $n_L$. Then, for each time stamp k, the forward $h^k$, backward $h^k$, forward $r^f_k$, and backward $r^b_k$ are concatenated all together to construct the final $h^k_{final}$ via Equation (6). This final $h^{k'}$ is then fed into FC (full connected layers in a neural network) to predict $\hat{x}_{k+1}$. This is shown in FIG. 2C.

Figure 3A:
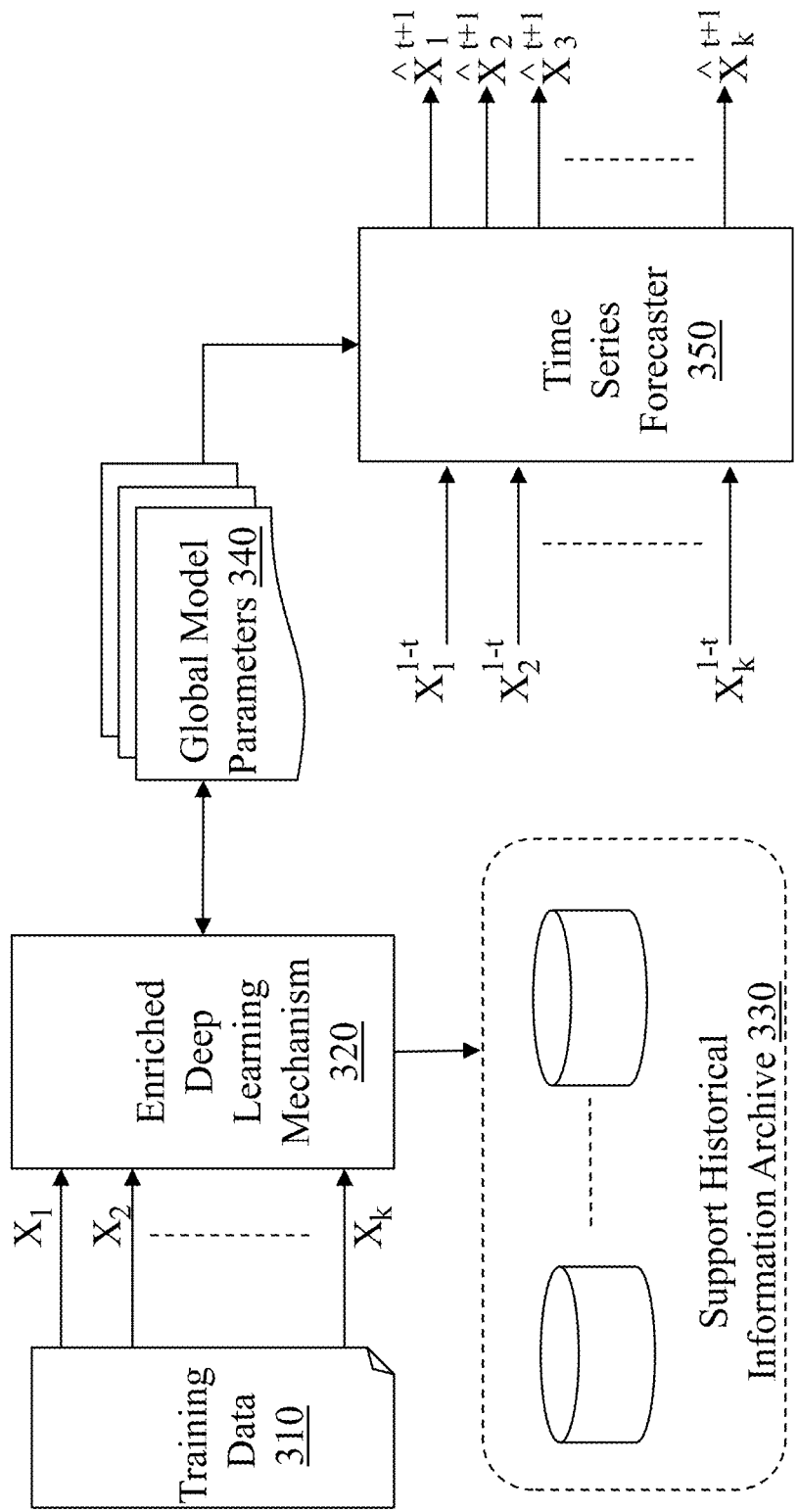
FIGS. 3A-3C depict different exemplary frameworks for enriched/customized deep learning of time series forecasting, in accordance with embodiments of the present teaching.

Improving the expressiveness of the hidden representation via historic data query and enrichment enables better forecasting ability without having to be trained on a massive amount of data. This addresses the challenge of inadequate training data. FIG. 3A depicts an exemplary high level system diagram of a configuration 300 for enhanced time series forecasting via enrichment, in accordance with an exemplary embodiment of the present teaching. The configuration 300 of the CTSF framework includes a training data archive 310, an enriched deep learning mechanism 320, and a time series forecaster 350. The enriched deep learning mechanism 320 is deployed for learning from input time series training data $X_1, X_2, \ldots, X_m$. When the time series training data are received by the enriched deep learning mechanism 320, it queries, based on its learned representations, the historic time series data (which may represent more varieties and longer time series) stored in a supporting historic information archive 330 to enrich the expressiveness of the representation by leveraging the HTP graph, in accordance with the formulations discussed herein. After enrichment, enriched feature vectors are generated that incorporate relevant historic information and, hence, representing enriched time series information. With such enriched feature vectors for training, it enables the enriched deep learning mechanism 320 to capture characteristics of information that has more breadth and depth.

Figure 4A:
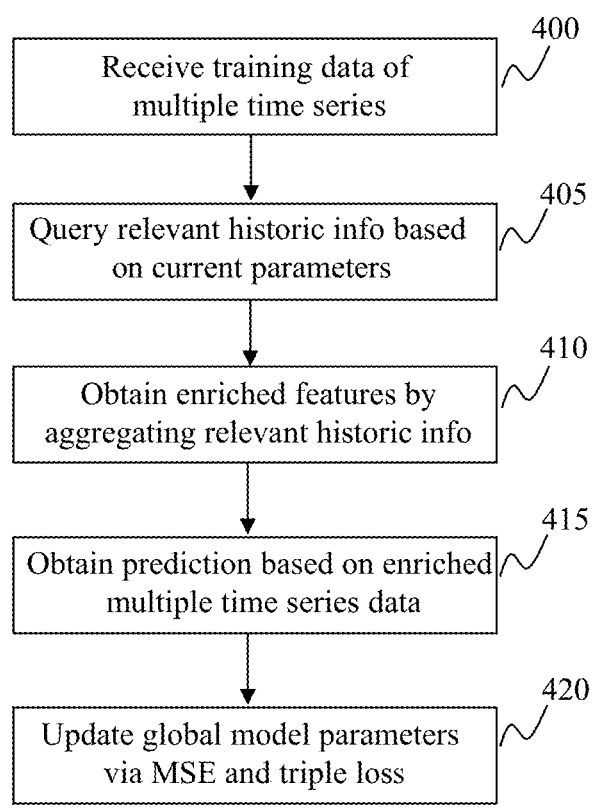
FIGS. 4A-4D are flowcharts of exemplary processes of different time series forecasting learning frameworks, in accordance with exemplary embodiments of the present teaching.

FIG. 4A is a flowchart of an exemplary process of the enriched deep learning mechanism 320, in accordance with an exemplary embodiment of the present teaching. Upon receiving training time series input at 400, the enriched deep learning mechanism 320 queries, based on its learned hidden representations, the historic information (stored in the support historical information archive 330) at 405. Based on the queried historical patterns, the enriched deep learning mechanism 320 obtains, at 410, enriched or aggregated feature vectors in accordance with the exemplary formulations shown in Equations (3)-(6). The aggregated feature vectors are then fed to the neural network(s) in the 320 mechanism to generate, at 415, predictions of the time series input data. Based on such generated predictions, the enriched deep learning mechanism 320 then updates, at 420, the global model parameters 340 for the base model. Such updated model parameters obtained based on the enriched vectors can then be used by the time series forecaster 350 to predict a measurement of a time series based on past occurred time series data.

The effectiveness of HTP graph may heavily depend on how well the historical knowledge stored is extracted in forward graph representation $V^f$ and backward graph representation $V^b$. In some situations, it may be difficult to learn well by minimizing merely the MSE loss defined in Equation (2). To enhance the learning efficiency, a triplet loss function is used to optimize $V^f$ and $V^b$ by leveraging the intrinsic property contained in time series. It is based on the observation that two extracted historical patterns may show different distance influenced by whether each other come from the same time series or not. Such a distance may be small when the two extracted historical patterns are generated in different time periods of a same time series. That is, the intrinsic characteristics may exhibit over time in a consistent way. Conversely, such a distance may be large if two query embeddings are derived from different time series. A triple loss is formulated as follows:

$$\mathcal{L}_{graph} = \theta_0^* = \underset{\theta_0}{\arg\min} \sum_i \sum_j \sum_{t,t'} \max(0, \langle r_i^t, r_i^t \rangle, r_t^{t'} - \langle r_i^t, r_j^t \rangle, +m), \quad (7)$$

where $r_i^t = [r_{i,t}^f, r_{i,t}^b]$ is the extracted relevant historical patterns of time series $i$ at time step $t$, m is the margin value to control the difference strength between intra-distance and inter-distance. As seen, this formulation of the triplet loss is to enforce that the distance between $r_i^t$ and $r_i^{t'}$ (extracted relevant historical pattern of time series i at different timestamps t vs. t') are small while the distance between $r_i^t$ vs. $r_j^t$ are large (extracted relevant historical pattern of time series i vs. time series j at the same timestamp t).

As discussed herein, another aspect of the CTSF framework is related to customization of a globally learned base model using input data specific to a particular time series to generate model parameters that are optimized with respect to that particular time series for forecasting. As discussed herein, globally sharing model across different time series usually fail to capture individual temporal dependencies of each time series. Such as approach is usually not effective because different time series, e.g., $x_i$ vs $x_j$, can be quite different in nature so that and globally sharing the parameters does not work well.

To enhance the base model on its expressiveness with respect to each time series, the base model may be used as a basis for customization for each time series. With the customization in accordance with the present teaching, the forecasting capability in the field of time series prediction can be significantly enhanced. Although model customization can be achieved by separately training the models for different time series prediction using corresponding time series data, this approach is impractical in real-world scenarios for various reasons. For instance, deep learning models in the forecasting field need a large training dataset (as usual) to learn model parameters effectively. However, in reality individual time series usually do not have sufficient data to train a deep learning and well-performed network.

A solution to solve the dilemma as discussed herein is to leverage pretrained model parameters obtained based on a large shared dataset as model initialization and then adapt specific tasks by fine-tuning parameters using smaller datasets. Specifically, meta learning described with two phases: i) model initialization and ii) model customization. During the first phase for model initialization, a global deep learning based forecasting model or base model is trained using data typically from a large set of time series likely encompassing a long history. This set of time series training data is called source time series set denoted by $\mathcal{S}$. This $\mathcal{S}$ data set provides usually much more information, e.g., yearly seasonality, and enables the global base model to capture significant events such as Christmas, Thanksgiving, Mother's Day, July 4th, etc. Base model parameters are shared across all time series, hence represent the across time series knowledge or meta-knowledge. Source dataset $\mathcal{S}$ is used for this task.

During the model customization phase, based on the base model, target time series set $\mathcal{T}$ (usually limited without a long history) is used to learn customized deep learning based forecasting models with respect to individual time series in the target set $\mathcal{T}$. The base model parameters learned from the first phase serve as starting point so that although time series training data in target set $\mathcal{T}$ do not have enough data to train a deep learning model, they are adequate for customizing the model parameters.

Formally, in supervised machine learning, a predictive model $\hat{y}=f_\theta(x)$ parameterized by $\theta$ can be learned via training as follows:

$$\theta^* = \mathrm{argmin}_\theta L(f_\theta, \mathcal{S})$$

where L is a loss function that measures the degree of match between true labels and those predicted by the predictive model $f_\theta(.)$ based on the training dataset $\mathcal{S}$. In accordance with the present teaching, two types of losses are defined: $L_{mse}$ (Equation (2)) and $L_{graph}$ (Equation (7)). A combined loss is defined as:

$$\theta^* = \mathrm{argmin}_\theta L_{mse}(f_\theta, \mathcal{S}) + \gamma L_{graph}$$

$\gamma$ is a weight for $L_{graph}$, which can be learned during training. Parameter set $\theta^*$ corresponds to learned parameters during the first phase of training to obtain an initialized prediction model using cross time series data set $\mathcal{S}$. That is, $\theta^*$ is not customized and thus will not be effective for target time series (in target set $\mathcal{T}$).

In meta-learning according to the resent teaching, the source set $\mathcal{S}$ is divided into $\mathcal{S}=\{\mathcal{S}^{support}, \mathcal{S}^{query}\}$ or abbreviated as $\mathcal{S}=\{\mathcal{S}^s, \mathcal{S}^q\}$. Similarly, the target set $\mathcal{T}=\{\mathcal{T}^{support}, \mathcal{T}^{query}\}$ or abbreviated as $\mathcal{T}=\{\mathcal{T}^s, \mathcal{T}^q\}$. If following the naming convention in machine learning, $\mathcal{S}$ can be described as $\mathcal{S}=\{\mathcal{S}^{train}, \mathcal{S}^{validation}\}$ and $\mathcal{T}$ as $\mathcal{T}=\{\mathcal{T}^{train}, \mathcal{T}^{test}\}$, respectively. The subscript denotes a specific time series in those sets, hence the final notation in the paper $\mathcal{S}=\{\mathcal{S}_i^s, \mathcal{S}_i^q\}$ and $\mathcal{T}=\{\mathcal{T}_i^s, \mathcal{T}_i^q\}$.

The base model is first learned from source time series set $\mathcal{S}$ (shared training data) and then the base model parameters are modulated using target time series set $\mathcal{T}$. The goal is to learn the base/global model parameters $\theta_0^*$ on the $\mathcal{S}^s$ dataset such that the customized time-series specific parameters $\theta_i$ are good for the $i^{th}$ time series in the source set $\mathcal{S}_i^q$. Thus, it is a hierarchical (bi-level) optimization problem with outer and inner optimizations. Specifically, this hierarchical optimization problem is formulated as follows. The first level of optimization is formulated as:

$$\theta_0^* = \mathrm{argmin}_{\theta_0} \Sigma_i L_{mse}(f_{\theta_i}, \mathcal{S}_i^q) + \gamma L_{graph} \quad (8)$$

where $$\theta_i^* = \mathrm{argmin}_{\theta_i} \Sigma_i L_{mse}(f_{\theta_0}, \mathcal{S}_i^s) \quad (9)$$

with $\gamma$ being a weight for $L_{graph}$, $L_{mse}$ (Equation (2)) and $L_{graph}$ (Equation (7)) being the two types of losses as disclosed herein, and $\theta_0$ is fixed in Equation (8).

In the above formulation, Equation (8) is an outer loss function and is for searching for a global $\theta_0$ that serves as a good initialization for Equation (9) on each time series $S_i^s$. Equation (9) is an inner loss function for searching a time series specific $\theta_i$ that minimizes the outer loss function in Equation (8) for the customized model $f_{\theta_i}$ on the $i^{th}$ time series of the source validation (query) set $S_i^q$. The triple loss function $L_{graph}$ has an effect only on the outer optimization that searches for the global $\theta_0$ and has no effect on time series specific process searching for $\theta_i$. This is because $L_{graph}$ needs a large dataset to train and is an integral part of the overall deep learning model that needs a large dataset with a long history to train, while $L_{mse}$ is the main prediction loss, and can effectively customize the parameters to learn the time-specific parameters $\theta_i$ for each time series. Optimization of $\theta_i$ is typically with a few gradient updates given the fixed global parameter $\theta_0$ utilizing the data in $S_i^s$.

Equation (9) can be re-written as $$\theta_i = \theta_0 - \alpha \nabla_\theta L_{mse}(f_{\theta_0}, S_i^s) \quad (10)$$

where $\alpha$ is the learning rate for gradient descend.

Upon meta-training being complete and $\theta_0$ being finally converged as $\theta_0^*$ based on the source set $\mathcal{S}=\{\mathcal{S}_i^s, \mathcal{S}_i^q\}$, the learned base model parameter $\theta_0^*$ is used as the initialization for training the target/test dataset $\mathcal{T}_i^s$ as follows:

$$\theta_i = \theta_0^* - \alpha \nabla_\theta L_{mse}(f_{\theta_0}, \mathcal{T}_i^s) \quad (11)$$

Then the customized parameter $\theta_i$ can be used to make a prediction for $\mathcal{T}_i^q$.

Figure 3B:
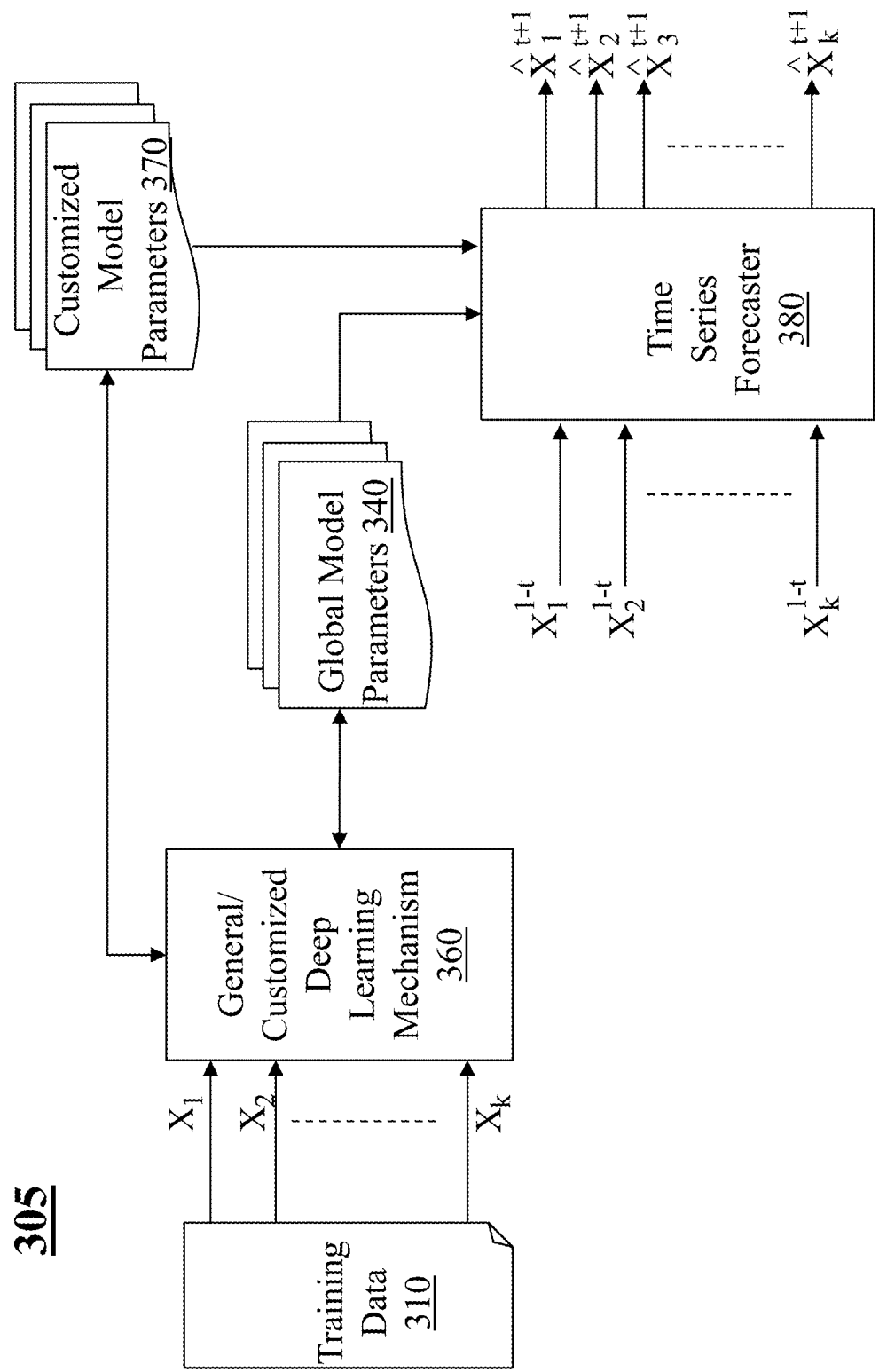

FIG. 3B depicts an exemplary framework 305 for customized deep learning of time series forecasting scheme, in accordance with an embodiment of the present teaching. In this exemplary depiction, the system is for carrying out deep learning by performing the meta-learning as discussed herein and comprises the training data archive 310, a general/customized deep learning mechanism 360, and a time series forecaster 380. In this illustrated embodiment, the general/customized deep learning mechanism 360 conducts deep learning in the model initialization and model customization phases, based on source data set $\mathcal{S}$ and target data set $\mathcal{T}$. The global model parameters obtained via deep learning based on training data across multiple time series in source $\mathcal{S}$ are stored in the global model parameters 340, while the customized model parameters obtained by customizing learned general model parameters based on training data from the target source $\mathcal{T}$ are stored in a customized model parameters archive 370. With both sets of model parameters via meta-learning, the time series forecaster 380 may perform general forecast of a measurement at time t based on time series input at time instants 1–t using the global model parameters 340 and/or special forecast of a measurement for a particular time series at time t based on the particular time series input at time instants 1–t using the customized model parameters 370.

Figure 4B:
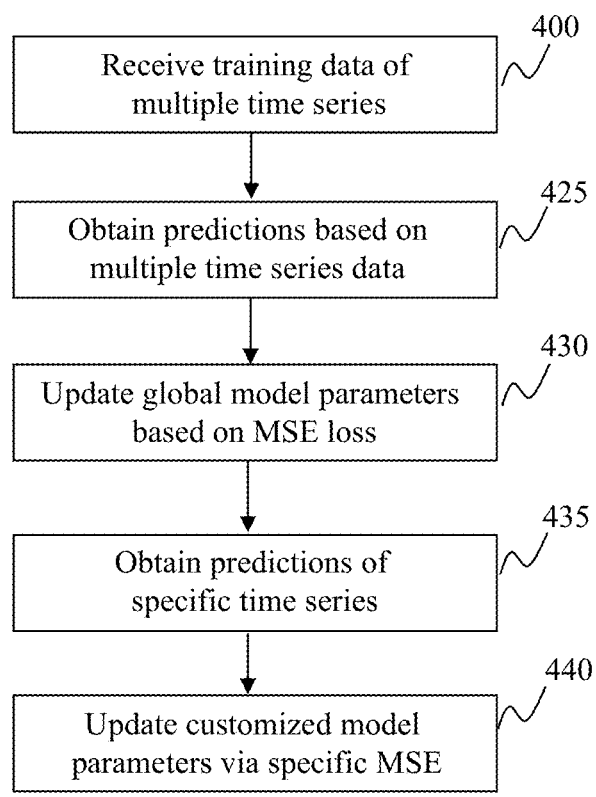

FIG. 4B is a flowchart of an exemplary process for the customized deep learning of time series forecasting scheme, in accordance with an embodiment of the present teaching. At step 400, training data from multiple time series are received and predictions are made based on the input training data using current global model parameters 340. The predictions and ground truth labels for the training data are obtained at 425 and used to compute loss and the global model parameters are updated, at 430, by the general/customized deep learning mechanism 360 via minimizing such loss. To update the customized model parameters for each time series, the predictions directed to the time series are obtained at 435 and corresponding loss for the time series is minimized in order to optimize the update to the customized model parameters at 440. Such optimized model parameters (340 and 370) via the meta-learning process may later be used by the tie series forecaster 380 to predict a measurement at time a of any time series based on input time series data at time instants 1–t.

Figure 3C:
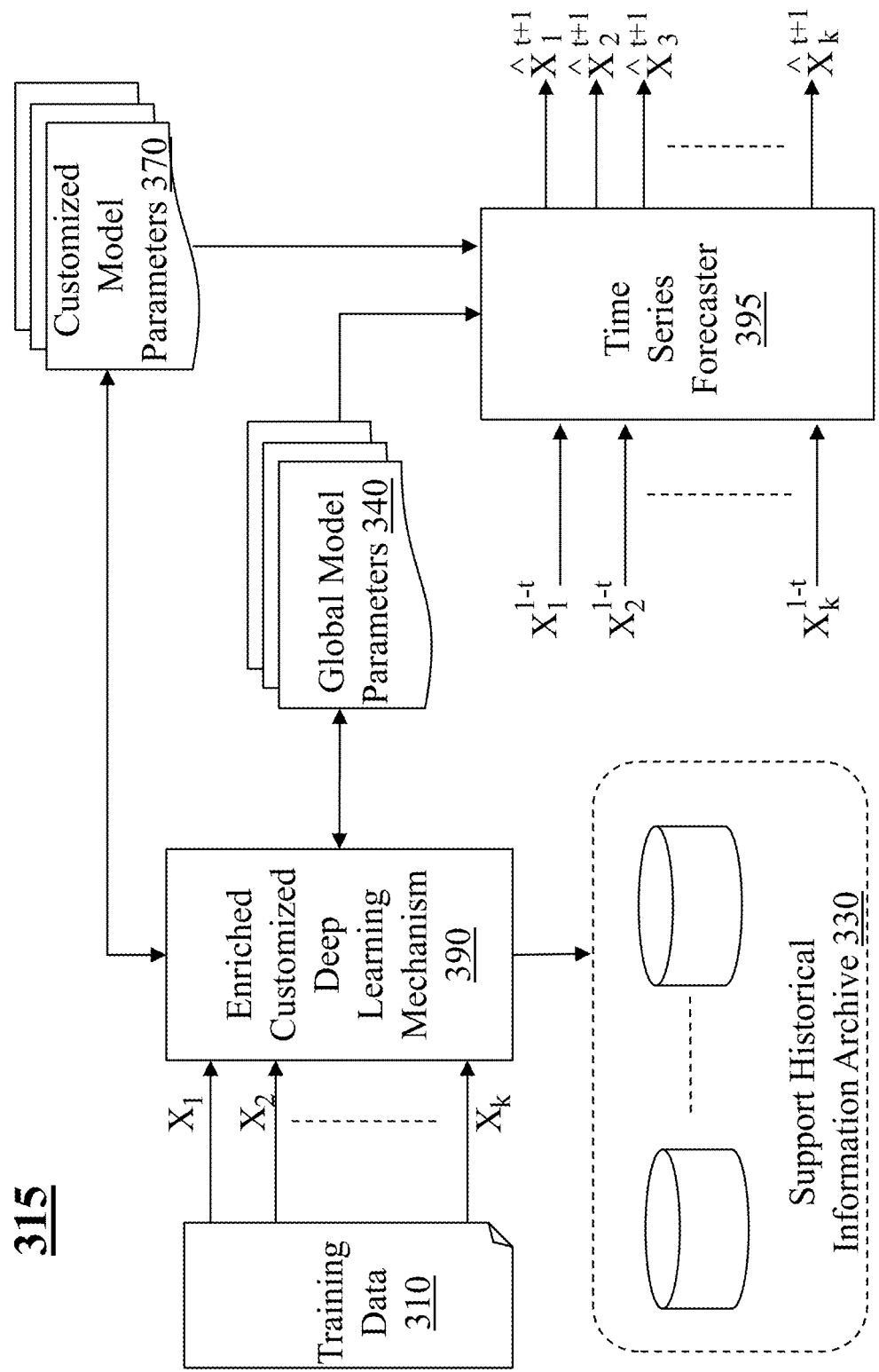

In the disclosure above, the aspect of enrichment and the aspect of customization are presented separately for the ease of understanding. Either aspect provides improvement over the prior art solutions and represents advancement in the field. In some embodiments, these two aspects of the present teaching may be used individually to enhance the performance of deep learning for time series forecasting. In some embodiments, these two aspects of the present teaching may be combined in applications. FIG. 3C depicts an exemplary framework 315 that deploys enriched customized deep learning of time series forecasting, in accordance with an embodiment of the present teaching. In this embodiment, the framework 315 includes the training data archive 310, an enriched customized deep learning mechanism 390, and a time series forecaster 395. In this framework 315, the enriched customized deep learning mechanism 390 is configured to perform both enrichment operation as disclosed of the framework 300 in FIG. 3A and the customization operation as disclosed of the framework 305 in FIG. 3B.

Figure 4C:
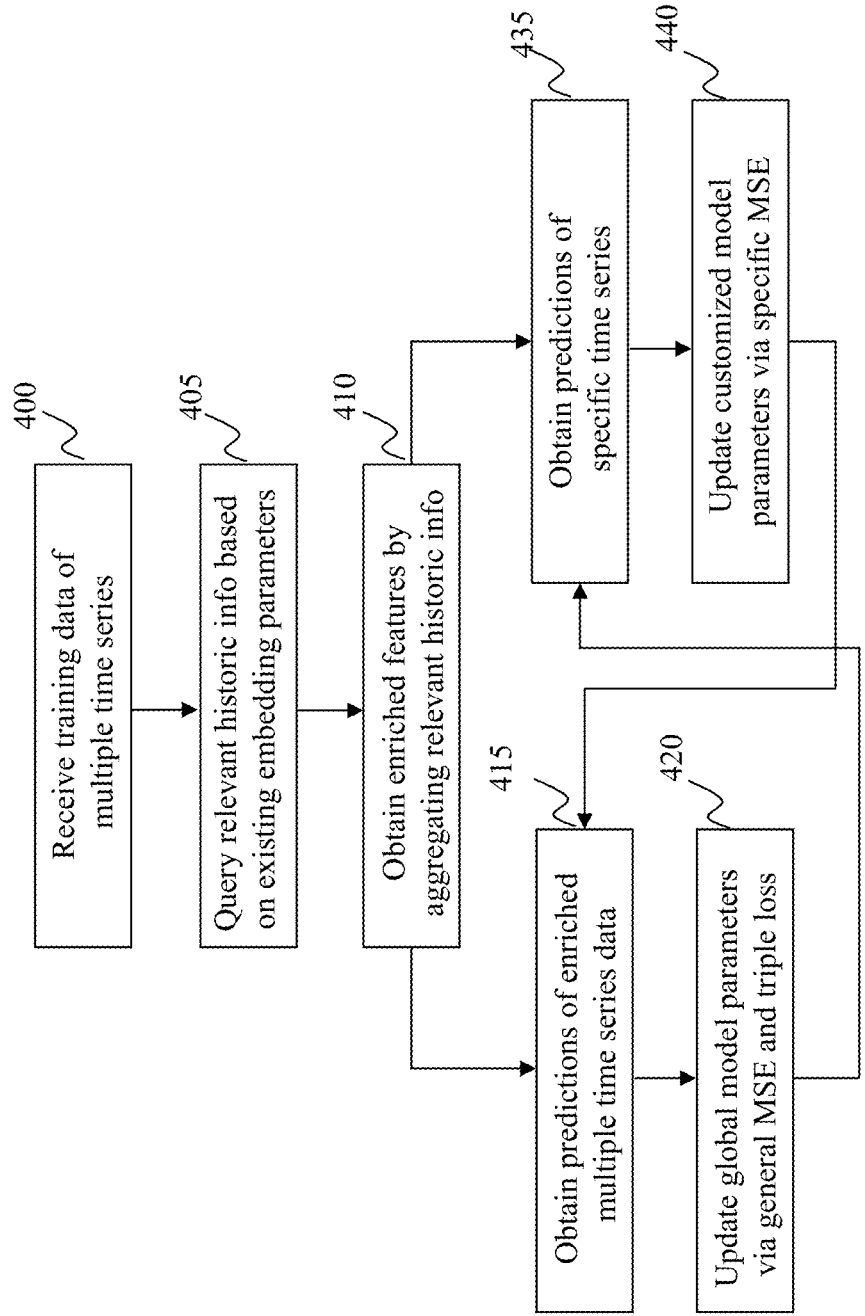

As shown, the framework 315 combines the components in both FIG. 3A and FIG. 3B. The global model parameters 340 and the customized model parameters 370 are derived via both enrichment and customization and, hence, represent improvement from both aspects of the present disclosure. In addition, in implementation, the two phases (general and customization) in the hierarchical optimization process may be carried out simultaneously or in sequence. FIG. 4C is a flowchart of an exemplary process of framework 315 in which the optimization in both phases is carried out simultaneously, in accordance with an embodiment of the present teaching. When input time series data are received, at 400, the historic information is queried based on existing embedded parameters at 405. Based on the query results, enriched feature vectors are obtained at 410 by aggregating relevant historic information. Based on the enriched feature vectors, the optimization of both phases are carried simultaneously.

The global optimization in the first phase of the hierarchical process is carried out at 415 and 420 to update the global model parameters 340 according to Equation (8) using the model parameters $\theta_i$ from the other phase for updating customized model parameters. Specifically, to update the global model parameters, the enriched customized deep learning mechanism 390 generate predictions based on current global model parameters at 415 and then updates, at 420, the global model parameters 340 based on the two losses, i.e., $L_{mse}(f_{\theta_i}, S_i^q)$ as defined in Equation (2) and the triple loss $L_{graph}$ as defined in Equation (7), in accordance with the optimization scheme as shown in Equation (8).

Conversely, the customized optimization of the second phase of the hierarchical process is carried out at 435 and 440 to update the customized model parameters 370 according to Equation (9) using the global model parameters $\theta_0$ from the global optimization phase. Specifically, in order to adjust the parameters for each time series, predictions are generated based on the relevant time series input first at 435 based on global model parameters $\theta_0$ as updated above. Such generated predictions and the true labels of the time series input are used to compute the loss $L_{mse}(f_{\theta_o}, S_i^s)$ to determine how to update the customized model parameters by minimizing the loss expressed in Equation (9). In this mode of operation, the updates to global and customized model parameters may be performed alternately towards convergence.

Figure 4D:
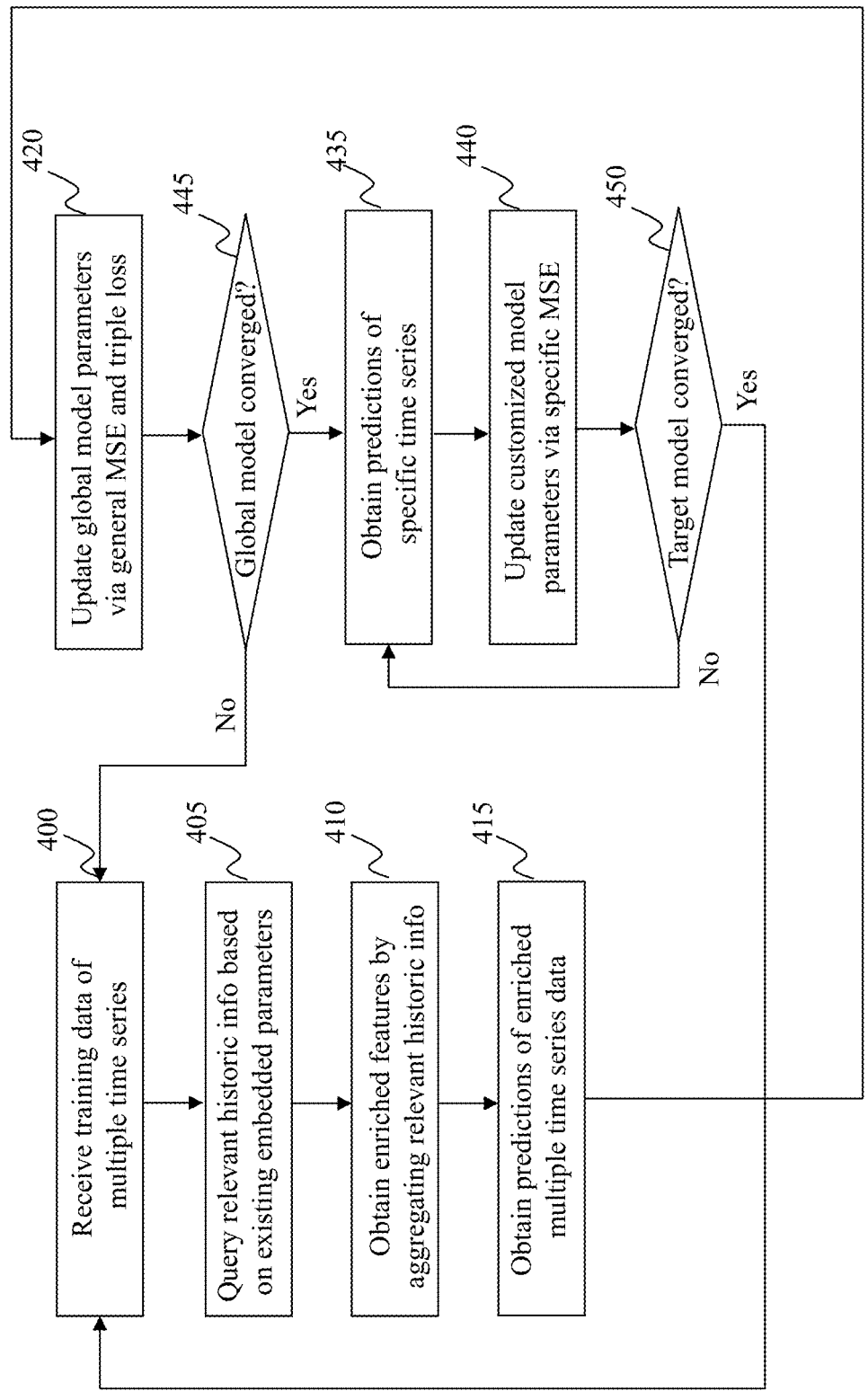

As discussed herein, an alternative embodiment is to establish converged model parameters in sequence. FIG. 4D is a flowchart of another exemplary process of framework 315 in which the two phase optimization is carried out in sequence, in accordance with an embodiment of the present teaching. In this mode of operation, the global model parameters are learned first until convergence and then the converged global model parameters are used as the basis for customization. Steps 400-420 are the same as what is described with reference to FIG. 4A. After each iteration of updating the global model parameters 340, it is determined, at 445, whether the global model parameters have converged. If they have not yet converged, the processing goes back to step 400 to repeat the phase of updating the global model parameters. The first phase continues until the step at 445 determines that the optimization of global model parameters have converged. At that point, the customization for each time series is initiated by obtaining, at 440, the predictions of the particular time series based on converged global model parameters $\theta_0$. Such predictions and the ground truth labels are then used to compute the loss $L_{mse}(f_{\theta_o}, S_i^s)$ which is minimized in order to determine how to update the customized model parameters 370. The customization process repeats if any of the target models for a particular time series has not converged, determined at 450.

Figure 5:
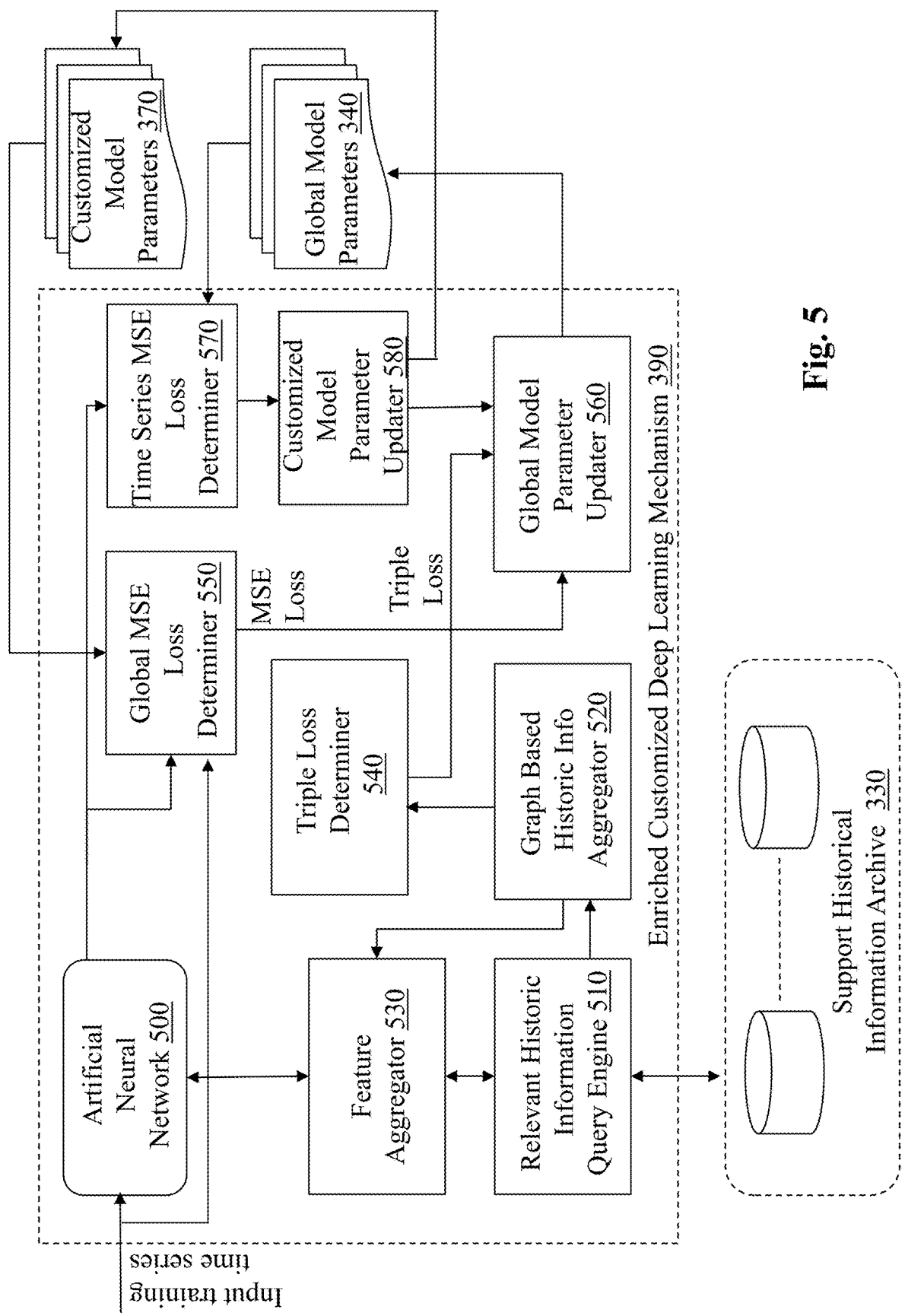
FIG. 5 depicts an exemplary high level system diagram of an enriched customized deep learning mechanism, in accordance with an exemplary embodiment of the preset teaching.

FIG. 5 depicts an exemplary high level system diagram of the enriched customized deep learning mechanism 390, in accordance with an exemplary embodiment of the preset teaching. As discussed herein, the enriched customized deep learning mechanism 390 is configured to be capable of handle both enrichment aspect and the customization aspect of the present teaching. However, it may also be configured to handle either of the aspects when appropriate control is introduced. These are implementation choices and do not serve as limitations to the present teaching.

In this illustrated embodiment, the enriched customized deep learning mechanism 390 comprises an artificial neural network 500, a relevant historic information query engine 510, a graph based historic information aggregator 520, a feature aggregator 530, a triple loss determiner 540, a global MSE loss determiner 550, a global model parameter updater 560, a time series MSE loss determiner 570, and a customized model parameter updater 580. These different components cooperate in the meta-learning framework as disclosed herein to carry out the enrichment of embedded feature vectors based on relevant historic information to improve the expressiveness of the model parameters and deriving both enhanced global model parameters (due to enrichment) and customize specific time series forecasting model parameters.

Figure 6:
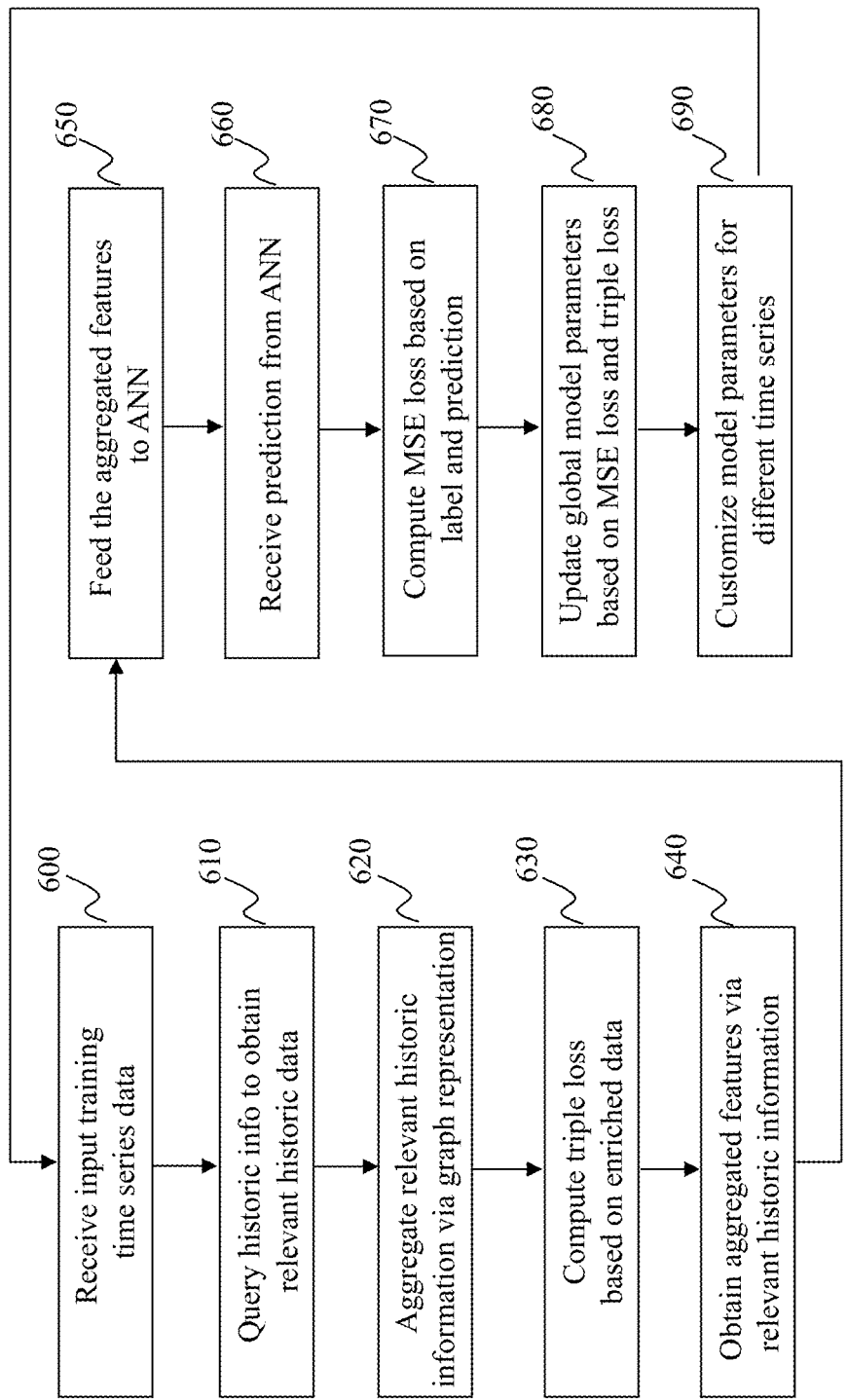
FIG. 6 is a flowchart of an exemplary process of an enriched customized deep learning mechanism, in accordance with an exemplary embodiment of the preset teaching.

FIG. 6 is a flowchart of an exemplary process of the enriched customized deep learning mechanism 390, in accordance with an exemplary embodiment of the preset teaching. To deep learn the model parameters of the artificial network 500, input training time series data are received, at 600, by the artificial neural network 500 in order to generate a prediction. To enrich the expressiveness of the embeddings, the relevant historic information query engine 510 generates a query in accordance with Equation (3) and use that to query, at 610 based on the existing embeddings, the support historical information archive 330 to obtain relevant historic information that can be used for enrichment.

The queried relevant historic information is used by the graph based historic info aggregator 520 to aggregate via attention mechanism as shown in Equation (4) in the forward direction. The same operation in the backward direction may also be similarly performed. Multiple types of historic information may be aggregated, at 620, by the graph based historic info aggregator 520 based on Equation (5). In addition, based on the historical information aggregation as shown in Equation (4), the triple loss determiner 540 computes, at 630, the triple loss $L_{graph}$ in accordance with Equation (7). The queried pattern vectors in both forward and backward directions as specified in Equation (4) are then projected by the feature aggregator 530 to the same feature space as the embeddings with concatenation with the original features as specified in Equation (6). This is performed by the feature aggregator 530 at 640.

The aggregated feature vectors are then fed, at 650, to the artificial network 500 to generate a forecasted measurement based on the input training time series. When the forecasted measurement (prediction) is received, at 660, by the global MSE loss determiner 550, it computes, at 670, the MSE loss $L_{mse}$ based on Equation (2). Such computed $L_{mse}$ and $L_{graph}$ are then used by the global model parameter updater 560 to determine how to update, at 680, the global model parameters stored in 340. As discussed herein, the optimization corresponds to a hierarchical process, which may update global and customized model parameters at the same time or in a sequence. If the operational mode is in a simultaneous mode, in order to update the customized model parameters, the time series MSE loss determiner 570 determines the LSE loss for each time series based on the current global model parameters as fixed values. Based on the time series specific MSE loss, the customized model parameter updater 580 may then update, at 690, the customized model parameters stored in 370 by minimizing the MSE loss specific to each time series. As discussed herein, in an alternative embodiment, the customized model parameters may not be updated until the global model parameters converge to their established form.

The process as described herein may continue to iterate on different input time series data so that the model parameters will be learned via this deep learning scheme until convergence. As described herein, enrichment and customization are independent aspects or separate improvement under the present teaching attributed to improvement to the current state of the art in time series forecasting. With the deep learned mode parameters, not only the time series forecasting for cross time series using global model parameters can be improved due to the enrichment, the quality of customization is also enhanced because the base model derived via enrichment incorporate relevant information from related historic data queried. At the same time, the customization as described herein allows rapid adaptation of general model parameters to specific target model parameters suitable and effective for each particular time series in the absence of large sum of training data.

Figure 7:
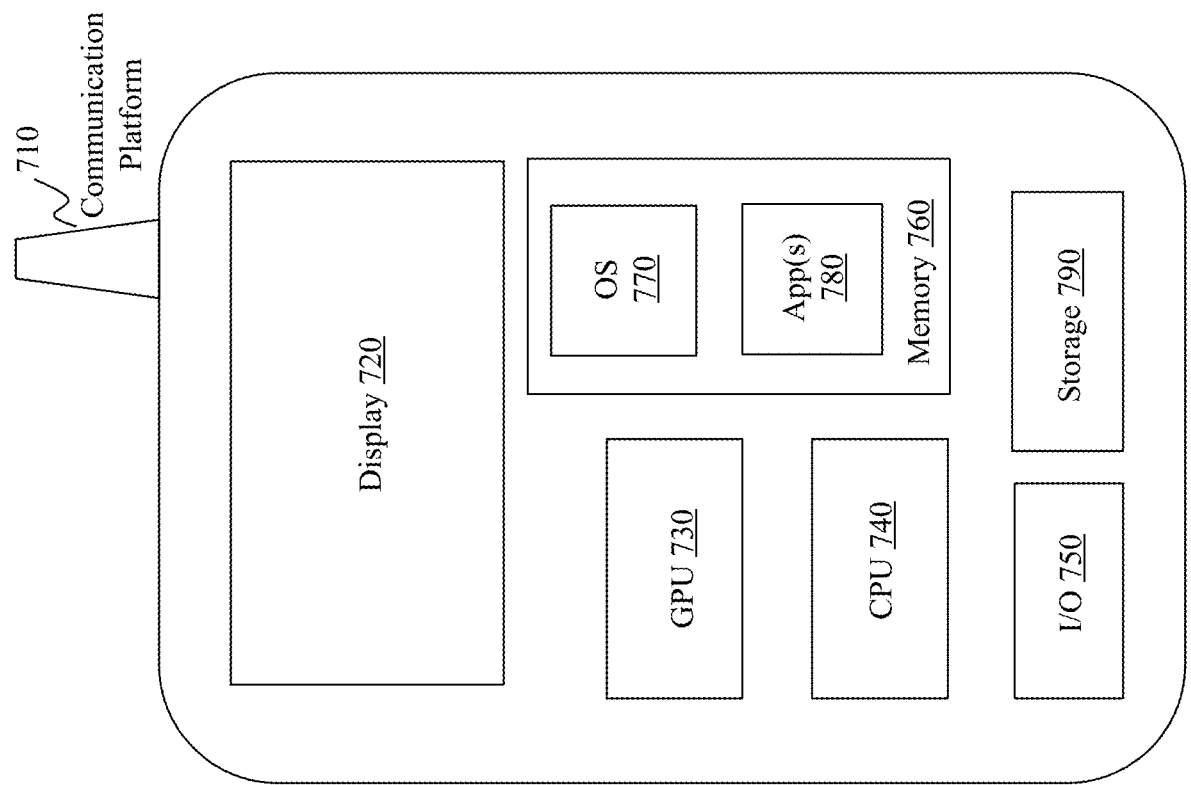
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 740. Any other suitable component, including but not limited to a system bus or a controller (not shown), may also be included in the mobile device 700. As shown in FIG. 7, a mobile operating system 770 (e.g., iOS, Android, Windows Phone, etc.), and one or more applications 780 may be loaded into memory 760 from storage 790 in order to be executed by the CPU 740. The applications 780 may include a browser or any other suitable mobile apps for managing a machine learning system according to the present teaching on mobile device 700. User interactions, if any, may be achieved via the I/O devices 740 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
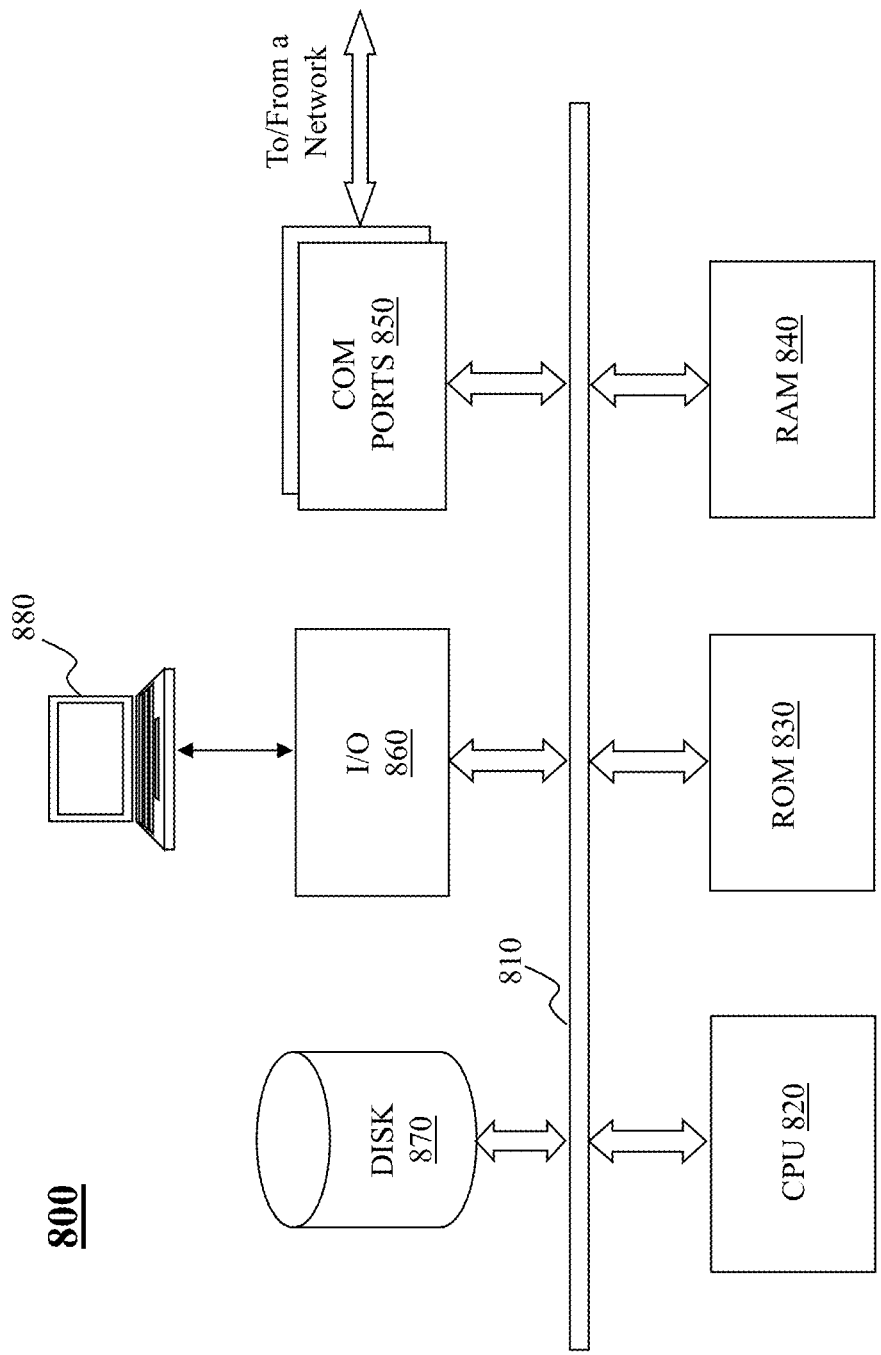
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 800 may be used to implement any component of the multi-task dual loop learning scheme, as described herein. For example, the learning system as disclosed herein may be implemented on a computer such as computer 800, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for machine learning, the method comprising:
    receiving input data associated with a time series;
    obtaining hidden representations associated with the time series in a feature space;
    generating a query vector based on the hidden representations in a query space, wherein the query vector comprises a forward query vector and a backward query vector, each of which corresponds to a linear transformation of the hidden representations;
    querying, based on the query vector and across a plurality of time series, relevant historic information related to the time series, wherein the time series is included in the plurality of time series;
    aggregating the relevant historic information with the query vector to generate at least one queried pattern vector; and
    enriching the hidden representations by aggregating therewith the at least one queried pattern vector to generate enriched hidden representations, wherein
    the enriched hidden representations enhance expressiveness of the hidden representations.

2. The method of claim 1, wherein the hidden representation corresponds to a set of parameters associated with a model learned for forecasting the time series.

3. The method of claim 1, further comprising forecasting the time series using the enriched hidden representations based on the input data to generate a prediction.

4. The method of claim 3, further comprising updating the enriched hidden representations based on an error based loss determined based on a discrepancy between a label of the input data and the prediction.

5. The method of claim 4, wherein the update to the enriched hidden representations is determined also based on a graph based loss determined based on inter-time-series relationships.

6. The method of claim 1, wherein
the input data include time series of different types;
the hidden representations are for forecasting the time series of the different types; and
the relevant historic information used to generate the enriched hidden representations encompasses time series of different types.

7. Machine readable and non-transitory medium having information recorded thereon for machine learning, wherein the information, when read by a machine, causes the machine to perform:
receiving input data associated with a time series;
obtaining hidden representations associated with the time series in a feature space;
generating a query vector based on the hidden representations in a query space, wherein the query vector comprises a forward query vector and a backward query vector, each of which corresponds to a linear transformation of the hidden representations;
querying, based on the query vector and across a plurality of time series, relevant historic information related to the time series, wherein the time series is included in the plurality of time series;
aggregating the relevant historic information with the query vector to generate at least one queried pattern vector; and
enriching the hidden representations by aggregating therewith the at least one queried pattern vector to generate enriched hidden representations, wherein
the enriched hidden representations enhance expressiveness of the hidden representations.

8. The medium of claim 7, wherein the hidden representation corresponds to a set of parameters associated with a model learned for forecasting the time series.

9. The medium of claim 7, wherein the information, when read by the machine, further causes the machine to perform forecasting the time series using the enriched hidden representations based on the input data to generate a prediction.

10. The medium of claim 9, wherein the information, when read by the machine, further causes the machine to perform updating the enriched hidden representations based on an error based loss determined based on a discrepancy between a label of the input data and the prediction.

11. The medium of claim 10, wherein the update to the enriched hidden representations is determined also based on a graph based loss determined based on inter-time-series relationships.

12. The medium of claim 7, wherein
the input data include time series of different types;
the hidden representations are for forecasting the time series of the different types; and
the relevant historic information used to generate the enriched hidden representations encompasses time series of different types.

13. A system for machine learning, comprising:
a relevant historic information query engine implemented on a processor and configured for
receiving input data associated with a time series,
obtaining hidden representations associated with the time series in a feature space,
generating a query vector based on the hidden representations in a query space, wherein the query vector comprises a forward query vector and a backward query vector, each of which corresponds to a linear transformation of the hidden representations, and
querying, based on the query vector and across a plurality of time series, relevant historic information related to the time series, wherein the time series is included in the plurality of time series;
a graph based historic information aggregator implemented on the processor and configured for aggregating the relevant historic information with the query vector to generate at least one queried pattern vector; and
a feature aggregator implemented on the processor and configured for enriching the hidden representations by aggregating therewith the at least one queried pattern vector to generate enriched hidden representations, wherein
the enriched hidden representations enhance expressiveness of the hidden representations.

14. The system of claim 13, wherein the hidden representation corresponds to a set of parameters associated with a model learned for forecasting the time series.

15. The system of claim 13, further comprising a time series forecaster configured for forecasting the time series using the enriched hidden representations based on the input data to generate a prediction.

16. The system of claim 15, further comprising a global model parameter updater implemented on the processor and configured for updating the enriched hidden representations based on an error based loss determined based on a discrepancy between a label of the input data and the prediction, wherein the update to the enriched hidden representations is determined also based on a graph based loss determined based on inter-time-series relationships.

17. The system of claim 13, wherein
the input data include time series of different types;
the hidden representations are for forecasting the time series of the different types; and
the relevant historic information used to generate the enriched hidden representations encompasses time series of different types.

* * * * *